UNITED STATES PATENT OFFICE.

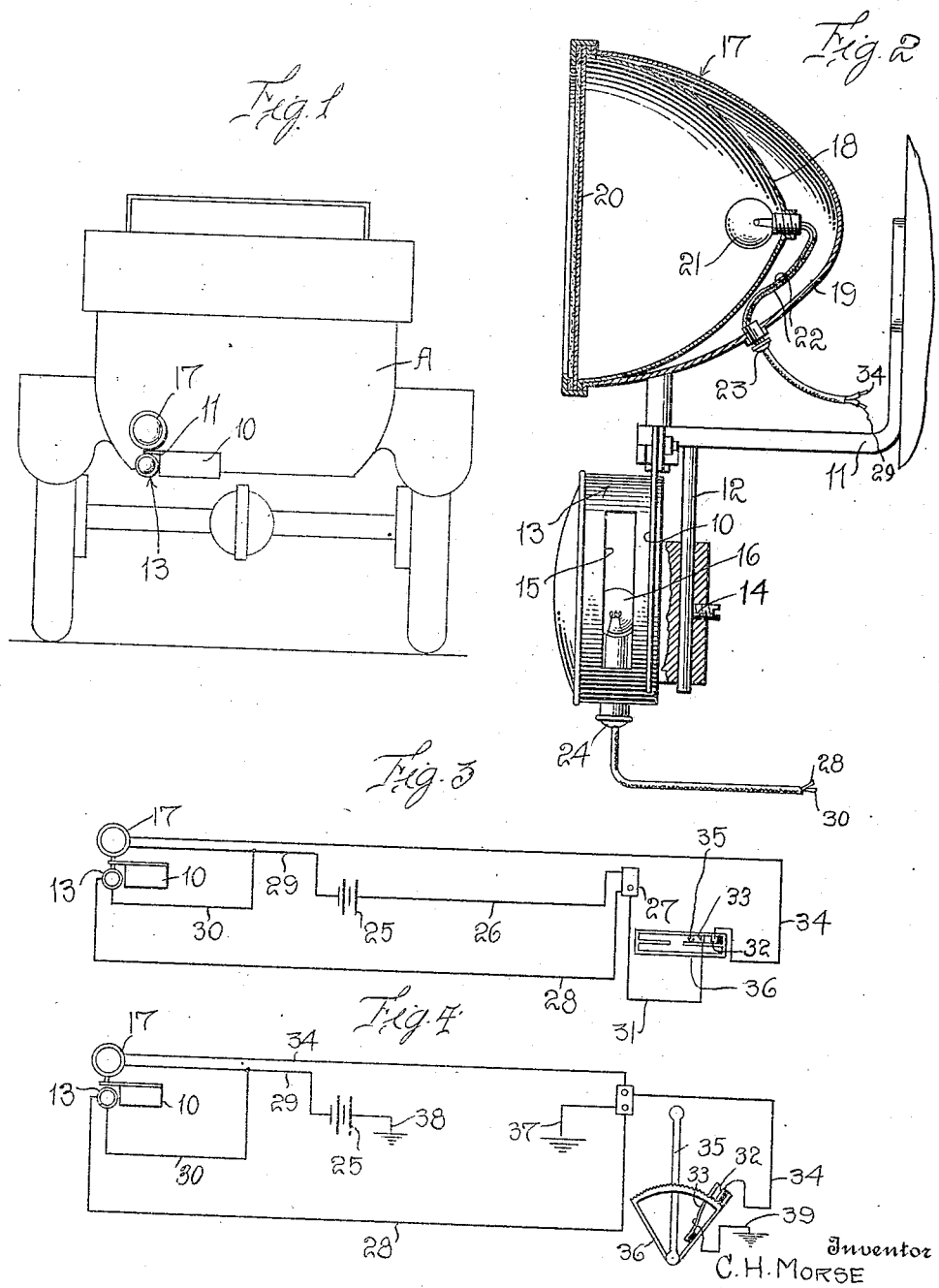

CLYLE H. MORSE, OF WILLIAMSTOWN, VERMONT.

REAR LAMP FOR AUTOMOBILES.

1,291,080.  Specification of Letters Patent.  Patented Jan. 14, 1919.

Application filed June 2, 1917. Serial No. 172,534.

*To all whom it may concern:*

Be it known that I, CLYLE H. MORSE, a citizen of the United States, residing at Williamstown, in the county of Orange and State of Vermont, have invented certain new and useful Improvements in Rear Lamps for Automobiles, of which the following is a specification, reference being had to the accompanying drawings.

This invention relates to automobiles, and more particularly to means for illuminating the road in the rear of the automobile, when the machine is backing.

The general object of this invention is to provide a rearwardly directed road illuminating lamp mounted upon an automobile and to provide means whereby, when the driving gears are shifted into "reverse" the road illuminating lamp will be energized to thereby cause the projection of a beam of light rearward from the machine automatically upon a reversal of the transmission gears, thus not only illuminating the road rearward of the machine but giving a signal to those behind the machine that the machine is about to back.

A further object is to provide a road illuminating lamp of this character which is adapted to be mounted on the same bracket as the tail lamp and to be used in connection with the tail lamp, and to provide a wiring system for the two lamps, whereby the tail lamp may be connected to the source of energy by means of the usual switch, this switch also placing the road illuminating lamp in interrupted circuit with the source of energy, and providing a second switch disposed in connection with the gear shifting lever so that when that gear shifting lever is thrown into a reverse position to cause the machine to back, this switch will be automatically shifted to complete the circuit through the road illuminating lamp.

Other objects will appear in the course of the following description.

My invention is illustrated in the accompanying drawings, wherein:—

Figure 1 is a rear view of an automobile provided with my improved rear lamps;

Fig. 2 is a side elevation partly in section of the road illuminating lamp, the tail lamp and the means for supporting these lamps; and Figs. 3 and 4 are diagrammatic views of the wiring whereby the lamps are energized.

Referring to the drawings, 10 designates a license plate, mounted upon an automobile A. Disposed adjacent the license plate is a bracket 11 of any suitable or usual form and supporting the depending hanger 12 upon which is mounted the tail lamp 13, which may be of any suitable construction and which is adjustably held upon the hanger 12 by means of the set screw 14. The housing of this tail lamp 13 is provided with the usual red glass lens and at its side is cut away as at 15, so that the rays from the lamp 16 may be projected laterally upon the license plate. The road illuminating lamp 17 has a parabolic reflector 18 and the housing 19 of the lamp is also parabolic in form. Across the open end of the lamp housing extends a clear glass pane 20 and disposed within the lamp housing is an incandescent lamp 21, from which the wires 22 lead to the socket 23. The electric lamp 16 of the tail light is also electrically connected to a suitable socket.

In Fig. 3, I illustrate one wiring system for this combination of lamps. In this figure, 25 designates the batteries or other source of current, the cells of which are connected to each other in the usual manner and from one pole of the battery extends a wire 26 to a dash switch 27, from which extends a wire 28 to the plug 24 of the tail lamp. From the plug 23 of the illuminating lamp 17 extends a wire 29, which is connected to one of the poles of the battery, and a return wire 30 from the tail lamp plug 24 connects to this return wire 29. From the dash switch 27 extends a wire or other conductor 31, which has electrical engagement with a contact member 33. Coacting with this contact member is a second contact member 32, which may be resiliently urged out of engagement with the contact member 33 and from this contact member 32 extends a wire 34, which leads to the plug 23, so that when the dash switch 27 is shifted to close the circuit from the wire 26 to the wire 31 and the contacts 32 and 33 are in engagement with each other, a circuit will be completed through the lamp 21.

Normally the contacts 32 and 33 are shifted out of engagement with each other by any suitable means, but they are shifted into engagement with each other by means of the gear shifting lever 35, which is of the usual type and operates within the usual sector frame 36. When the gear shifting lever is shifted into a position to throw in the reverse, it will engage with the contact 33, force it against the contact 32 and the circuit will be connected through the lamp 21. As soon as the gear shifting lever is shifted out of its reverse position, the circuit through the lamp 21 will be broken. In the system illustrated in Fig. 3, I have shown the return to the battery as being made through the wires 29 and 30. In Fig. 4, however, I have shown the return as being made through grounded wires 37, 38 and 39, these wires being grounded on the car in an obvious manner, the switch 27 in this figure being a two-button switch.

I do not wish to be limited to any particular system of wiring or even to the use of the gear actuating lever 35, as the means for automatically closing the circuit through the road illuminating lamp, as it is obvious that any other part of the mechanism which would be shifted to a certain position upon shifting the gearing into a "reverse" position could be used for this purpose. Neither do I wish to be limited to the exact construction illustrated as it is obvious that many changes may be made in the form of the road illuminating lamp, its manner of support, etc., without departing from the spirit of the invention, though I regard the particular construction illustrated as being very effective and preferable in many cases.

Having described my invention, what I claim is:

An attachment for automobiles comprising an angular bracket, having a downwardly depending rod, a tail lamp adjustably mounted upon the rod and having a lateral opening, a license plate mounted upon the bracket and disposed forward of the lateral opening of the lamp and extending laterally from said tail lamp, a road illuminating lamp having a post engaging said bracket, and an electric light mounted within said lamp.

In testimony whereof I hereunto affix my signature in the presence of two witnesses.

CLYLE H. MORSE.

Witnesses:
ABBIE H. MORSE,
JOHN C. BURNETT.

Copies of this patent may be obtained for five cents each, by addressing the "Commissioner of Patents, Washington, D. C."